US008738326B2

(12) United States Patent  
Gurijala et al.

(10) Patent No.: US 8,738,326 B2
(45) Date of Patent: May 27, 2014

(54) PERFORMANCE CHARACTERISTIC CALCULATION AND COMPARISON

(75) Inventors: Phani Raghavender Gurijala, Marietta, GA (US); William Theadore Fisher, Roswell, GA (US); Rajan Gupta, Marietta, GA (US); Mallikarjan Puttappa Narayanpur, Karnataka (IN); Ryan Margate Pastrana, Kansas City, MO (US); Eric Thomas Pool, Roswell, GA (US); Subramaniam Krishnakumar Sastry, Marietta, GA (US); Janna Christiaanse Walsh, Roswell, GA (US); Difei Wang, Marietta, GA (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 13/070,161

(22) Filed: Mar. 23, 2011

(65) Prior Publication Data

US 2012/0245892 A1   Sep. 27, 2012

(51) Int. Cl.
*G06F 19/00* (2011.01)
(52) U.S. Cl.
USPC .......................................... 702/182; 701/100
(58) Field of Classification Search
CPC ................................................. G06F 11/3409
USPC .......................................... 702/182; 701/100
See application file for complete search history.

(56) References Cited

U.S. PATENT DOCUMENTS

| | | |
|---|---|---|
| 4,410,950 A | 10/1983 | Toyoda et al. |
| 6,785,633 B2 | 8/2004 | Patanian et al. |
| 6,909,960 B2 | 6/2005 | Volponi et al. |
| 2003/0125905 A1 | 7/2003 | Patanian et al. |
| 2003/0125906 A1 | 7/2003 | Guaglardi |
| 2003/0163288 A1* | 8/2003 | Follin et al. ................... 702/188 |
| 2003/0229572 A1 | 12/2003 | Raines et al. |
| 2008/0027616 A1 | 1/2008 | Zhang et al. |
| 2008/0147465 A1 | 6/2008 | Raines et al. |
| 2008/0154473 A1 | 6/2008 | Volponi et al. |
| 2008/0177505 A1 | 7/2008 | Volponi |
| 2008/0289680 A1 | 11/2008 | MacFarlane |
| 2009/0055130 A1* | 2/2009 | Pandey et al. ................. 702/183 |
| 2012/0245892 A1 | 9/2012 | Gurijala et al. |

FOREIGN PATENT DOCUMENTS

| | | |
|---|---|---|
| EP | 1326008 A1 | 7/2003 |
| JP | 2004426237 A2 | 2/2003 |
| JP | 2009047092 A2 | 3/2009 |
| JP | 2008088961 A | 10/2011 |
| WO | 03058362 A1 | 7/2003 |

* cited by examiner

*Primary Examiner* — John Breene
*Assistant Examiner* — Haihui Zhang
(74) *Attorney, Agent, or Firm* — Cantor Colburn LLP

(57) ABSTRACT

A method of performance calculation and comparison is provided and includes collecting, at a central location, data relating to a performance characteristic of a machine, calculating at the central location and from the collected data, the performance characteristic of the machine and comparing the calculated performance characteristic with a target performance characteristic.

20 Claims, 3 Drawing Sheets

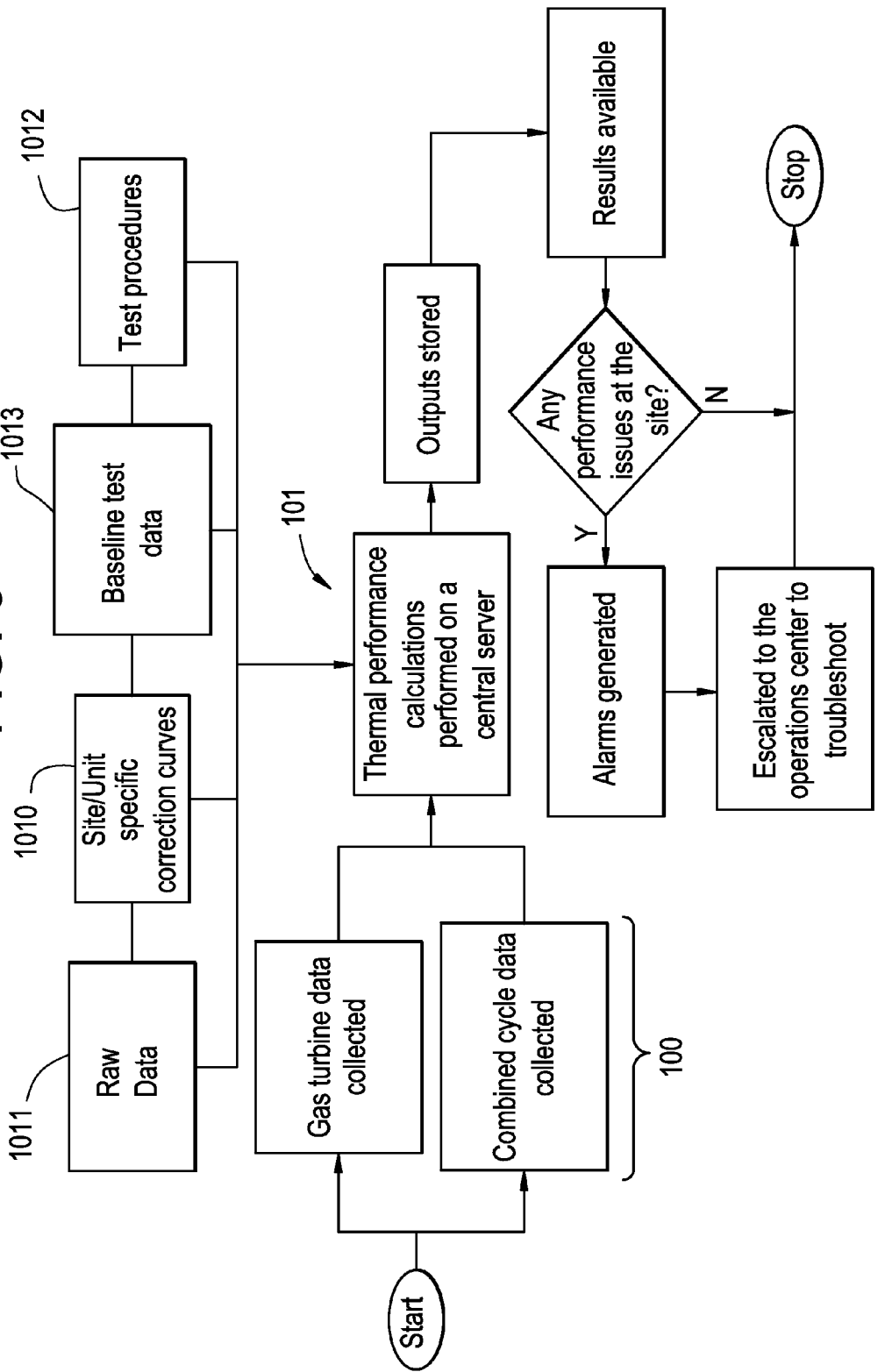

PERFORMANCE CHARACTERISTIC CALCULATION AND COMPARISON

BACKGROUND OF THE INVENTION

The subject matter disclosed herein relates to performance characteristic calculation and comparison.

Current processes for calculating performance degradation of, for example, gas turbine engines that are provided as part of a fleet of gas turbine engines use site-specific correction factors and require a substantial amount of manual effort. Generally, the processes for a particular site involve conducting a performance test at a specified interval, usually every one year, with the test engineer conducting the test at baseload operation. Performance degradation data is gathered from the test results and correction factors for the site are applied to obtain the corrected output and heat rate of the site. Percentage output and heat rate degradation values for the site are then calculated using the corrected output and heat rate values and the site-specific reference values. Degradation percentage values are then compared to contractually guaranteed outputs and heat rate degradation values to identify whether the site is performing better or worse than the guarantee. Bonus or liquidated damage (LD) amounts are then calculated using variations from the guarantee and bonus/LD rates. These processes are repeated for all required sites.

In addition, if the degradation is higher than the guarantee, a root cause analysis is performed to identify areas of improvement and recommendations may be provided to improve the performance of the assets at each site. If the improvement measures are implemented, the benefits of those measures are not realized until the next performance test.

Thus, potential problems with current processes are that information related to degradation is available only after a performance test with little to no information being available to the test engineer on the amount of degradation prior to the test. Thus, there is little to no room or opportunity for improvement during off-test periods with little to no line-of-sight between subsequent performance tests. Also, cycle time to identify and mitigate risk is high, degradation information on a whole fleet is difficult to view, identifying the most degraded machine or the machine that needs the most immediate attention is difficult and effects of intermittent maintenance actions such as water washes, leak fixes, filter cleaning, etc., cannot be identified or tracked. Finally, there is often no central database available to store test results.

BRIEF DESCRIPTION OF THE INVENTION

According to one aspect of the invention, a method of performance calculation and comparison is provided and includes collecting, at a central location, data relating to a performance characteristic of a machine, calculating at the central location and from the collected data, the performance characteristic of the machine and comparing the calculated performance characteristic with a target performance characteristic.

According to another aspect of the invention, a method of performance calculation and comparison is provided and includes scheduling at a first interval on-site inspections of a machine disposed remotely from a central location, collecting, at the central location and at a second interval, which is substantially shorter than the first interval, data relating to a performance characteristic of the machine, calculating at the central location, at the second interval, and from the collected data, the performance characteristic of the machine and comparing the calculated performance characteristic with a target performance characteristic.

According to yet another aspect of the invention, a system to perform a performance calculation and comparison is provided and includes a computing device operably disposed at a central location, a machine operably disposed at a location remote from the central location and a plurality of sensors operably disposed at the machine to sense operational conditions thereof and to generate data reflective of a performance characteristic of the machine in accordance with the operational conditions, the computing device being configured to collect the generated data, to calculate the performance characteristic and to compare the calculated performance characteristic with a target thereof.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a flow diagram illustrating a further embodiment of the method of FIG. 2.

The detailed description explains embodiments of the invention, together with advantages and features, by way of example with reference to the drawings.

DETAILED DESCRIPTION OF THE INVENTION

Figure 1:
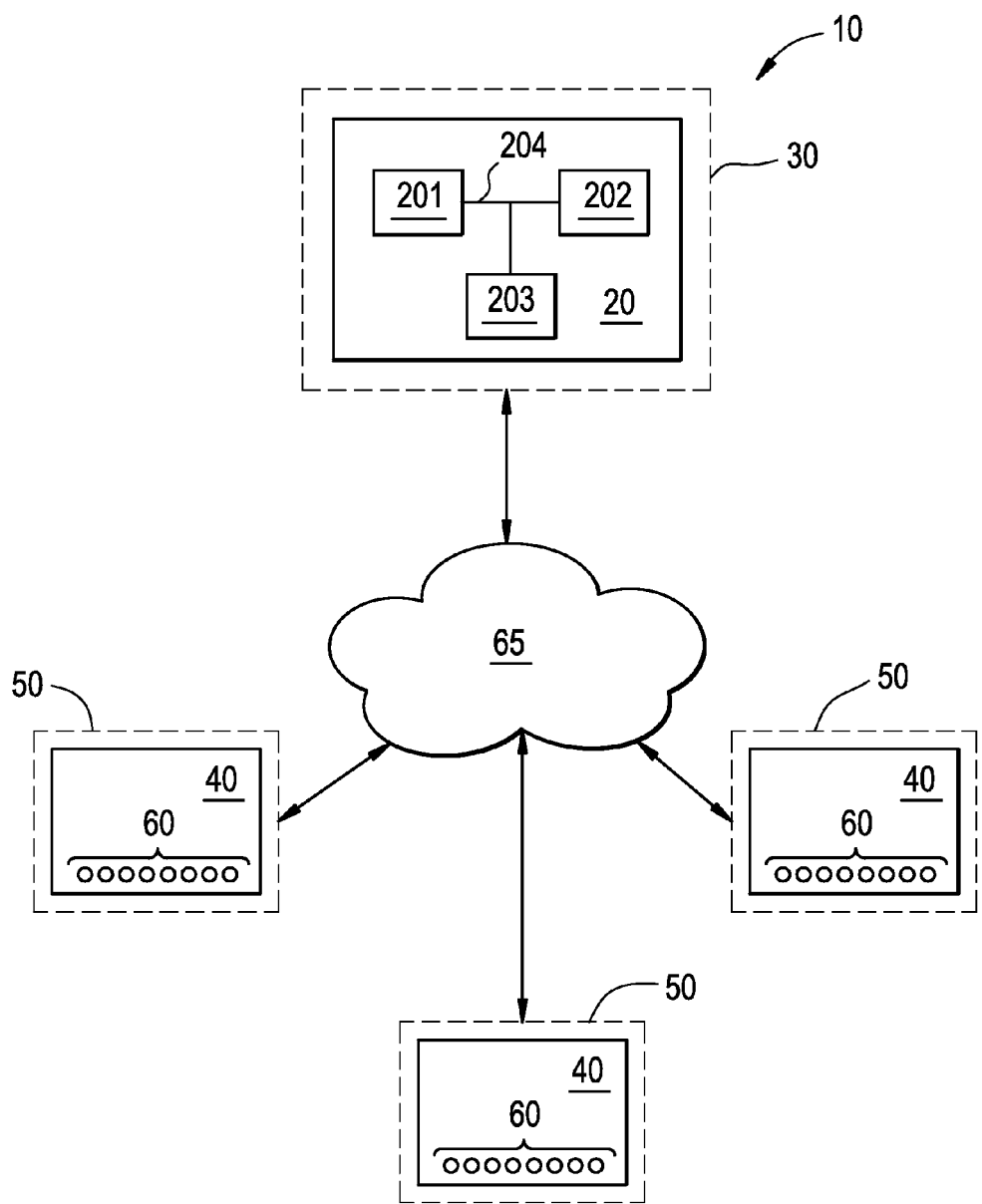
FIG. 1 is a schematic view of a system to perform a performance calculation and comparison.

With reference to FIG. 1, a system 10 to perform a performance calculation and comparison is provided. The system 10 includes a computing device 20 operably disposed at a central location 30, a machine 40 operably disposed at a location 50, which may be remote from the central location 30, and a plurality of sensors 60. The plurality of sensors 60 may be operably disposed at the machine 40 to sense operational conditions thereof and to generate data reflective of a performance characteristic of the machine 40 in accordance with the operational conditions. The machine 40 may be provided as one of a plurality of machines 40 of a fleet whereby each machine is disposed at a corresponding separate remote location 50.

The computing device 20 includes a storage unit 201, a processor 202, a networking unit 203. The networking unit 203 permits communication between the plurality of sensors 60 and the computing device 20 over a network 65. A bus 204 connects the storage unit 201, the processor 202 and the networking unit 203. The storage unit 201 includes memory capacity for storing various types of databases and information and has executable instructions stored thereon, which, when executed, cause the processor 202 and the networking unit 203 to execute the methods described herein. In particular, the computing device 20 is configured to collect the generated data from the sensors 60 (along with the generated data of other sensors 60 in the system 10), to calculate the performance characteristic of the machine 40 (along with the performance characteristic of other machines 40 in the system 10) and to compare the calculated performance characteristic with a target thereof.

Figure 2:
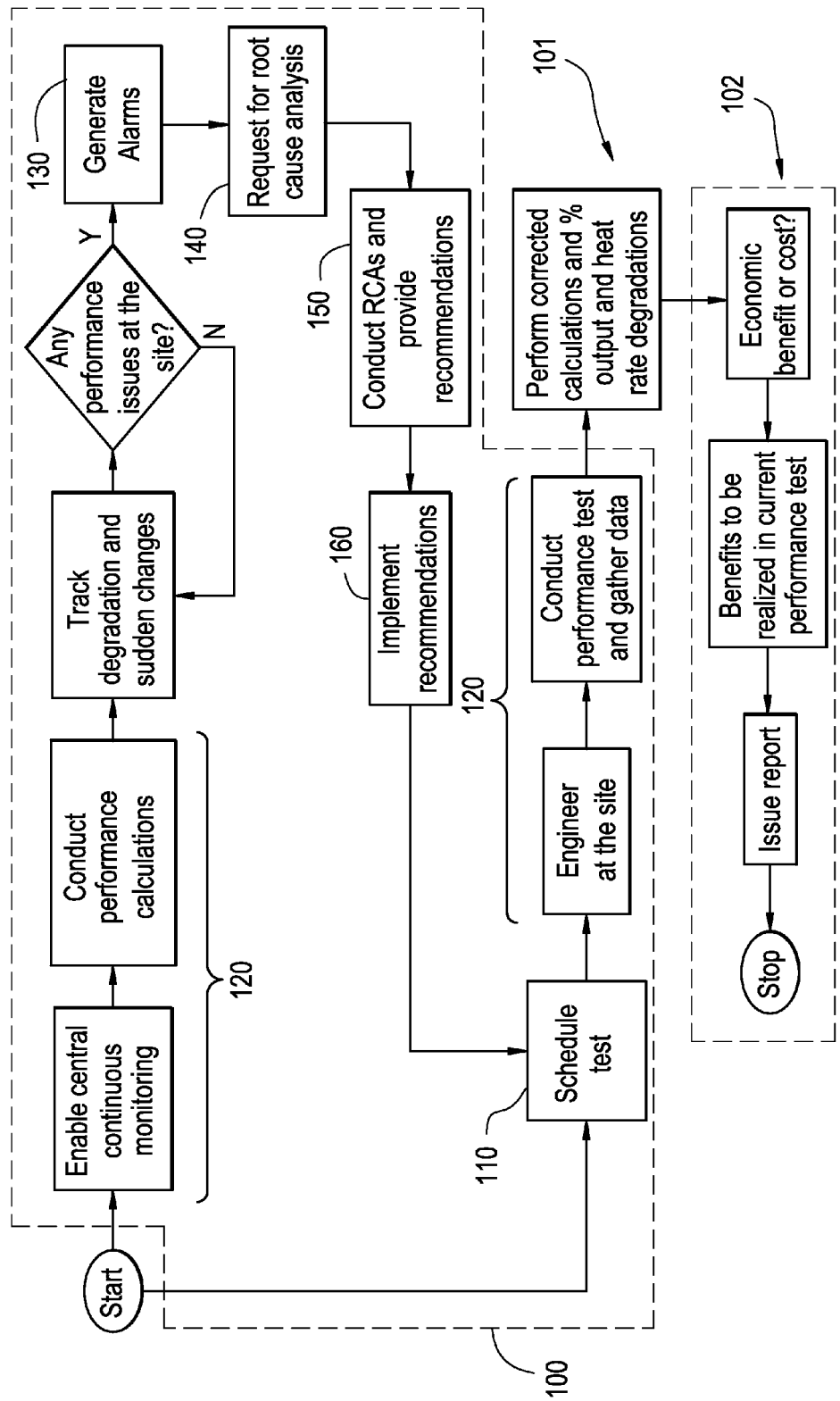
FIG. 2 is a flow diagram illustrating a method of performance calculation and comparison.

With reference to FIGS. 2 and 3, the system 10 may perform a method of performance calculation and comparison that includes collecting, at a central location, data relating to a performance characteristic of a machine disposed remotely from the central location (operation 100), calculating at the central location and from the collected data, the performance characteristic of the machine (operation 101) and comparing the calculated performance characteristic with a target performance characteristic (operation 102). The performance characteristic calculation of operation 102 may relate to performance degradation of the machine 40, which may be provided as part of a fleet of machines. The method may be conducted at scheduled intervals or, in some cases, on demand.

More particularly, the method may include scheduling on-site inspections or performance tests of the machine 40 at the remote location 50 (operation 110). The scheduling may be made at a first interval that may be annual or semi-annual based on the travels costs and availability of the test engineer. In this case, the real-time collecting and calculating of operations 101 and 102 would be conducted at a second interval, which is substantially shorter than the first interval and may be on the order of seconds, minutes or hours. Although it may be redundant, the scheduled on-site inspections or performance tests of the machine 40 may also include the manual or automatic collection of the data from the sensors 60.

The method may further include an operation of enabling monitoring (operation 120) of the machine 40. The enabling may be accomplished by, for example, operably disposing the plurality of sensors 60 at the machine 40 to sense operational conditions thereof and to generate the data. The plurality of the sensors 60 may include, for example, pressure gauges, fluid flow gauges, thermocouples, sensors for determining an amount of power generated by the machine and additional sensors for sensing similar conditions. The operational conditions being inspected, measured and tested may include at least one or more of power generation measurements, exterior and/or interior machine 40 temperatures, machine 40 pressures and fluid flow through the machine 40.

As shown in FIG. 2, the collecting of operation 100 at the central location 30 or on-site allows for real-time or near real-time tracking of degradation of the machine 40 and thereby permits sudden changes to be identified. Where such sudden changes are identified, the method may further include generating an alarm (operation 130) in accordance with a result of the collecting being indicative of a severe issue associated with a substantial increase or change of the collected data and/or a predefined number of anomalous calculating results. Severe issues include, but are not limited to, relatively high observed degradation rates, sudden increases in a percentage degradation of output or heat rate, two, three or more consecutive water washes yielding negative degradation, a difference between the calculated and guaranteed degradation being above certain limit and a case where potential liquidated damages (LD) are high based on a predefined site LD rate.

In a case where an alarm is generated, the method may include requesting a root cause analysis of the severe issue (operation 140), providing recommendations for correcting the severe issue (operation 150) and implementing those recommendations (operation 160). The implementing may be conducted over the network 65 with the test engineer possibly off-site.

The calculating of operation 101 involves the development of a calculation algorithm that calculates a site-corrected output and heat rate using site specific correction factors or curves 1010, raw data from various databases 1011, such as data reflective of contract degradation values and bonus liquidated damages caps, performance test procedures and methodologies 1012 and baseline test information 1013. The algorithm may be run for all the remote locations 50 and may be generated on various specified intervals. The calculating of operation 101 may further include a validation of the collected data. In this case, the algorithm may also include data validation checks to identify inappropriate values of certain ones of the plurality of sensors 60 and to either replace those inappropriate values with more reasonable values or identify an alternate one of the plurality of sensors 60 for substitute use.

In accordance with the comparison of operation 102, the target performance characteristic is defined in accordance with a contractually guaranteed performance characteristic and the calculating may include identifying whether the target performance characteristic for a predefined period is met or exceeded and determining that an economic benefit is due the machine 40 manufacturer/operator for exceeding the target performance characteristic or that a cost can be charged in accordance with the target performance characteristic not being met. In addition, the comparison may also include storing data reflective of the calculated performance characteristic and issuing a report relating to the stored data.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A non-transitory computer-readable medium configured to implement a method of performance calculation and comparison, comprising:
   regularly scheduling on-site inspections of a machine by a test engineer;
   collecting, at a central location, data relating to a performance characteristic of a machine, the collecting being conducted at a substantially shorter interval than an interval defined by the regularly scheduling;
   calculating at the central location and from the collected data, the performance characteristic of the machine; and
   comparing the calculated performance characteristic with a target performance characteristic.

2. The method according to claim 1, wherein the performance characteristic calculation relates to performance degradation of the machine.

3. The method according to claim 1, further comprising:
   generating an alarm in accordance with a result of the calculating, the alarm being indicative of an issue associated with an increase or change in the calculating result and/or a predefined number of anomalous calculating results;
   requesting a root cause analysis of the issue; and
   providing recommendations for correcting the issue.

4. The method according to claim 1, wherein the calculating comprises accounting for site specific correction factors, raw data from a database associated with the central location, performance characteristic test methodology and baseline test information, wherein the raw data comprises data reflective of contract degradation values and bonus liquidated damages caps.

5. The method according to claim 1, wherein the calculating further comprises:
validating the collected data;
identifying inappropriate values of certain sensors operably coupled to the machine; and
replacing the inappropriate values or identifying alternate sensors for substitute use.

6. The method according to claim 1, wherein the target performance characteristic is defined in accordance with a contractually guaranteed performance characteristic and the method further comprises:
identifying whether the target performance characteristic for a predefined period is met or exceeded;
determining that an economic benefit is due to a manufacturer or operator of the machine in accordance with a result the identifying of whether the target performance characteristic for the predefined period is met or exceeded; and
determining that a cost can be charged in accordance with the result of the identifying of whether the target performance characteristic for the predefined period is met or exceeded.

7. A non-transitory computer-readable medium configured to implement a method of performance calculation and comparison, comprising:
scheduling at a first interval on-site inspections by a test engineer of a machine disposed remotely from a central location;
collecting, at the central location and at a second interval, which is substantially shorter than the first interval, data relating to a performance characteristic of the machine;
calculating at the central location, at the second interval, and from the collected data, the performance characteristic of the machine; and
comparing the calculated performance characteristic with a target performance characteristic.

8. The method according to claim 7, wherein the performance characteristic calculation relates to performance degradation of the machine.

9. The method according to claim 7, further comprising enabling monitoring of the machine by operably disposing a plurality of sensors at the machine to sense operational conditions thereof and to generate the data.

10. The method according to claim 9, wherein the operational conditions comprise at least one or more of power generation measurements, machine temperatures, machine pressures and fluid flow through the machine.

11. The method according to claim 7, further comprising generating an alarm in accordance with a result of the calculating, the alarm being indicative of an issue.

12. The method according to claim 11, wherein the issue is associated with an increase or change in the calculating result and/or a predefined number of anomalous calculating results.

13. The method according to claim 11, further comprising:
requesting a root cause analysis of the severe issue; and
providing recommendations for correcting the severe issue.

14. The method according to claim 7, wherein the calculating comprises accounting for site specific correction factors, raw data from a database associated with the central location, performance characteristic test methodology and baseline test information, wherein the raw data comprises data reflective of contract degradation values and bonus liquidated damages caps.

15. The method according to claim 7, wherein the calculating comprises:
validating the collected data;
identifying inappropriate values of certain sensors operably coupled to the machine; and
replacing the inappropriate values or identifying alternate sensors for substitute use.

16. The method according to claim 7, wherein the target performance characteristic is defined in accordance with a contractually guaranteed performance characteristic.

17. The method according to claim 16, further comprising:
identifying whether the target performance characteristic for a predefined period is met or exceeded;
determining that an economic benefit is due to a manufacturer or operator of the machine in accordance with a result the identifying of whether the target performance characteristic for the predefined period is met or exceeded; and
determining that a cost can be charged in accordance with the result of the identifying of whether the target performance characteristic for the predefined period is met or exceeded.

18. The method according to claim 7, further comprising:
storing data reflective of the calculated performance characteristic; and
issuing a report relating to the stored data.

19. The method according to claim 7, further comprising conducting the calculating and the comparing on demand.

20. A system to perform a performance calculation and comparison, comprising:
a computing device operably disposed at a central location;
a machine operably disposed at a location remote from the central location; and
a plurality of sensors operably disposed at the machine to sense operational conditions thereof and to generate data reflective of a performance characteristic of the machine in accordance with the operational conditions,
the computing device being configured to collect the generated data at a substantially shorter interval than an interval defined by regularly scheduled on-site inspections of the machine by a test engineer, to calculate the performance characteristic and to compare the calculated performance characteristic with a target thereof,
the target being defined in accordance with a contractually guaranteed performance characteristic and the computing device being further configured for:
identifying whether the target for a predefined period is met or exceeded;
determining that an economic benefit is due to a manufacturer or operator of the machine in accordance with a result the identifying of whether the target for the predefined period is met or exceeded; and
determining that a cost can be charged in accordance with a result of the identifying of whether the target for the predefined period is met or exceeded.

* * * * *